United States Patent Office 3,224,833
Patented Dec. 21, 1965

3,224,833
INORGANIC PERCHLORATE COMPOSITIONS
Gene C. Robinson, Baton Rouge, La., assignor to Ethyl Corporation, New York, N.Y., a corporation of Virginia
No Drawing. Filed Nov. 28, 1961, Ser. No. 155,893
4 Claims. (Cl. 23—14)

This invention relates to and has as its principal object the provision of novel inorganic perchlorate compounds of lithium and the alkaline earth metals and the provision of novel methods for the preparation of such compounds, the novel compounds being of particular use as oxidizing agents in jet and rocket fuels and for other purposes.

The compositions of this invention are inorganic compounds of the general formula $$M(ClO_4)_n \cdot N_2O_4$$

In this formula, M is lithium or an alkaline earth metal and $n$ is the valence of M. The compositions of this invention are, in general, solid compounds which are stable at ordinary temperatures and can readily be prepared and stored without special precautions (other than the exclusion of moisture) for future use. These compounds decompose rapidly at moderately elevated temperatures without melting, for which reason storage should take place at temperatures not greatly in excess of room temperature. These compositions are white crystalline compounds which differ little in appearance from the simple perchlorates from which they are made.

The compounds of this invention are extensively soluble in water but the solutions undergo a fairly rapid hydrolytic decomposition.

Of the metal represented by M in the above formula, magnesium is preferred because of the relatively high stability and ease of preparation and storage of the corresponding compounds.

The compounds of this invention are prepared by combining under reaction conditions the inorganic component compounds, namely the lithium or alkaline earth metal perchlorate and dinitrogen tetroxide. The reaction temperatures are limited by the decomposition temperature of the reactants and products, and are normally not greatly in excess of room temperature.

The invention will be more fully understood by reference to the following illustrative examples in which all parts and percentages are by weight.

Example I 33 parts (0.148 mole) of commercial anhydrous magnesium perchlorate were placed in a glass reactor. 356 parts (3.97 moles) of $N_2O_4$ were condensed onto the sample at 0° C. The reactor was sealed and the mixture was stored for 72 hours at 25° C. The reactor was then opened and the excess $N_2O_4$ was removed at room temperature under a reduced pressure of 35–40 mm. of mercury. The product (46 parts; calculated for

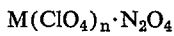

46.5 parts) was not different in gross appearance from the starting material. Its density was 2.199 grams per cc. at 25°. It was highly soluble in water, with which it reacted rapidly.

Heated in vacuum at 70–80° C., the above product evolved brown gases, presumably $NO_2$, and these were reversibly absorbed on cooling. When the product was heated to 100° C. or higher, an irreversible decomposition occurred, a permanent gas, presumably oxygen, being generated.

Example II 34 parts (0.32 mole) of anhydrous lithium perchlorate is treated with a large excess (570 parts, 6.2 moles) of $N_2O_4$ for a period of 24 hours at 15° C. A good yield of $LiClO_4 \cdot N_2O_4$ is obtained.

Example III

Anhydrous calcium perchlorate (72 parts, 0.3 mole) and $N_2O_4$ (550 parts, 6 moles) are combined at 20° C. and are permitted to react for a period of 48 hours. The product, $Ca(ClO_4)_2 \cdot N_2O_4$, is obtained in good yield.

In making the valuable compounds of this invention, the metal of the perchlorate reactant can be varied somewhat. Specifically, this metal can be lithium or any of the alkaline earth elements. Of these, lithium and magnesium are preferred since because of their small atomic volumes they can act as "atomic cements" to hold the nitrogen oxides together. In general, the lighter the metal the stronger is this bonding effect.

The reactants used in the preparation of the compounds of this invention can be employed in a wide variety of proportions. These can range from a 100 percent or greater excess of the perchlorate reactant to a 100 percent or greater excess of the nitrogen tetroxide reactant. However, for the purpose of assuring adequate contact between the reactants, a large excess of the liquid dinitrogen tetroxide is normally employed. The liquid state of the dinitrogen tetroxide enables it to function not only as a reactant, but as a reaction solvent which thus obviates the need of any other solvent.

The reactions of this invention may be carried out at any temperature within the normal liquid range of the dinitrogen tetroxide reactant or at higher temperatures, provided the liquid phase is maintained by the application of pressure. However, this temperature range is also subject to limits set by the stability ranges of the reactants and products. Thus, temperatures in the range of −20 to 80° C. and higher are employable although best results are obtained between 0 and 25° C. and this range is therefore preferred.

Because the reactions usually proceed at a satisfactory rate under the autogenous pressure of the dinitrogen tetroxide, that pressure is usually satisfactory, but pressures ranging from 10 mm. of mercury to 100 atmospheres may be used if desired.

The products of this invention, because of their high contents of available oxygen, are valuable oxidizers for jet and rocket fuels. In this utility the magnesium compound is of particular value since it contains 61 percent of oxygen, much of which is present as perchlorate ion. By way of comparison, ammonium perchlorate, another well known jet fuel oxidizer, contains only 56 percent of oxygen. In this use, the compounds of this invention are employed in much the same fashion as ammonium perchlorate, which is cited in a number of patents, among them U.S. 2,943,446.

The compounds of this invention are also useful as sources of oxygen for the determination of carbon and hydrogen in organic compounds and as portable sources of oxygen for use in fuel cells and the like.

Having thus described the process and novel products of this invention, it is not intended that it be limited except as set forth in the following claims.

I claim:
1. A compound represented by the general formula $M(ClO_4)_n \cdot N_2O_4$, wherein M is a metal selected from the group consisting of lithium and the alkaline earth metals and $n$ is the valence of M.
2. The compound represented by the formula

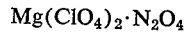

3. The method of preparing a compound represented by the general formula $M(ClO_4)_n \cdot N_2O_4$, wherein M is a metal selected from the group consisting of lithium and the alkaline earth metals and $n$ is the valence of M, which comprises reacting a substantially anhydrous perchlorate of the general formula $M(ClO_4)_n$, wherein M and $n$ have the meaning hereinbefore defined, with dinitrogen tetroxide.

4. The method of preparing the compound represented by the general formula $Mg(ClO_4)_2 \cdot N_2O_4$ which comprises reacting substantially anhydrous magnesium perchlorate with dinitrogen tetroxide.

No references cited.

BENJAMIN HENKIN, *Primary Examiner.*

CARL D. QUARFORTH, *Examiner.*